(12) United States Patent
Lee

(10) Patent No.: US 9,207,483 B2
(45) Date of Patent: Dec. 8, 2015

(54) IN-CELL TOUCH DISPLAY PANEL STRUCTURE WITH METAL LAYER ON LOWER SUBSTRATE FOR SENSING

(71) Applicant: SuperC-Touch Corporation, New Taipei (TW)

(72) Inventor: Hsiang-Yu Lee, New Taipei City (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 31 days.

(21) Appl. No.: 14/151,093

(22) Filed: Jan. 9, 2014

(65) Prior Publication Data

US 2014/0192275 A1    Jul. 10, 2014

(30) Foreign Application Priority Data

Jan. 10, 2013    (TW) .............................. 102200535 U

(51) Int. Cl.
| | | |
|---|---|---|
| *G02F 1/1335* | (2006.01) | |
| *G02F 1/1333* | (2006.01) | |
| *G02F 1/1343* | (2006.01) | |
| *G02F 1/1362* | (2006.01) | |
| *G06F 3/041* | (2006.01) | |

(52) U.S. Cl.
CPC ...... *G02F 1/13338* (2013.01); *G02F 1/133512* (2013.01); *G02F 1/136286* (2013.01); *G06F 3/0412* (2013.01)

(58) Field of Classification Search
CPC .......... G02F 1/13338; G02F 1/133512; G02F 1/136286; G06F 3/0412
USPC ............................................. 349/12, 110, 139
See application file for complete search history.

(56) References Cited

U.S. PATENT DOCUMENTS

2010/0156827 A1* 6/2010 Joo et al. ........................ 345/173

FOREIGN PATENT DOCUMENTS

KR     2010-0046891 A     5/2010

\* cited by examiner

*Primary Examiner* — Nathanael R Briggs
(74) *Attorney, Agent, or Firm* — Muncy, Geissler, Olds & Lowe, P.C.

(57) ABSTRACT

An in-cell touch display panel structure with metal layer on lower substrate for sensing includes an upper substrate, a lower substrate, a liquid crystal layer, a black matrix layer and a thin film transistor and sensing electrode layer. The upper substrate and the lower substrate are in parallel with each other and the liquid crystal layer is configured between the upper substrate and the lower substrate. The black matrix layer is disposed at one surface of the upper substrate, and is composed of a plurality of opaque lines. The thin film transistor and sensing electrode layer is disposed at one surface of the lower substrate, and includes a plurality of scanning lines, a plurality of data lines, and a plurality of sensing conductor lines. The plurality of sensing conductor lines is disposed corresponding to positions of the plurality of opaque lines of the black matrix.

10 Claims, 6 Drawing Sheets

IN-CELL TOUCH DISPLAY PANEL STRUCTURE WITH METAL LAYER ON LOWER SUBSTRATE FOR SENSING

BACKGROUND OF THE INVENTION

1. Field of the Invention

The present invention discloses a structure of touch display panel and, more particularly, an in-cell touch display panel structure with metal layer on lower substrate for sensing.

2. Description of Related Art

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technology were invented to overcome the drawbacks of traditional touch technology described above. The on-cell technology is to dispose a sensor on the back side of a color filter substrate to form a completed color filter substrate. One of the on-cell touch technologies is provided to dispose a touch sensor on a thin film and then bond the thin film onto the upper one of the two substrates.

The in-cell technology is to dispose the sensor within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

There is older touch control technology known as out-cell, which is typically applied to the resistive and capacitive touch panels. The out-cell touch technology is provided to add a touch module onto a display module. The touch module and the display module can be manufactured by the two separated parties.

However, for all the in-cell, on-cell and out-cell touch technologies, they all need a sensing layer to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Therefore, it desired for the aforementioned touch display panel structure to be improved.

SUMMARY OF THE INVENTION

The object of the present invention is to provide an in-cell touch display panel structure with metal layer on lower substrate for sensing, which greatly decreases the weight and thickness of a TFT touch LCD panel and also significantly reduces the material and manufacturing cost.

To achieve the object, there is provided an in-cell touch display panel structure with metal layer on lower substrate for sensing, which includes: an upper substrate; a lower substrate parallel to the first substrate; a liquid crystal layer configured between the upper substrate and the upper substrates; a black matrix layer disposed at one surface of the upper substrate facing the liquid crystal layer, the black matrix layer being composed of a plurality of opaque lines; and a thin film transistor and sensing electrode layer disposed at one surface of the lower substrate facing the liquid crystal layer, the thin film transistor and sensing electrode layer including a plurality of scanning lines, a plurality of data lines, and a plurality of sensing conductor lines, wherein the plurality of sensing conductor lines are disposed corresponding to positions of the plurality of opaque lines of the black matrix.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
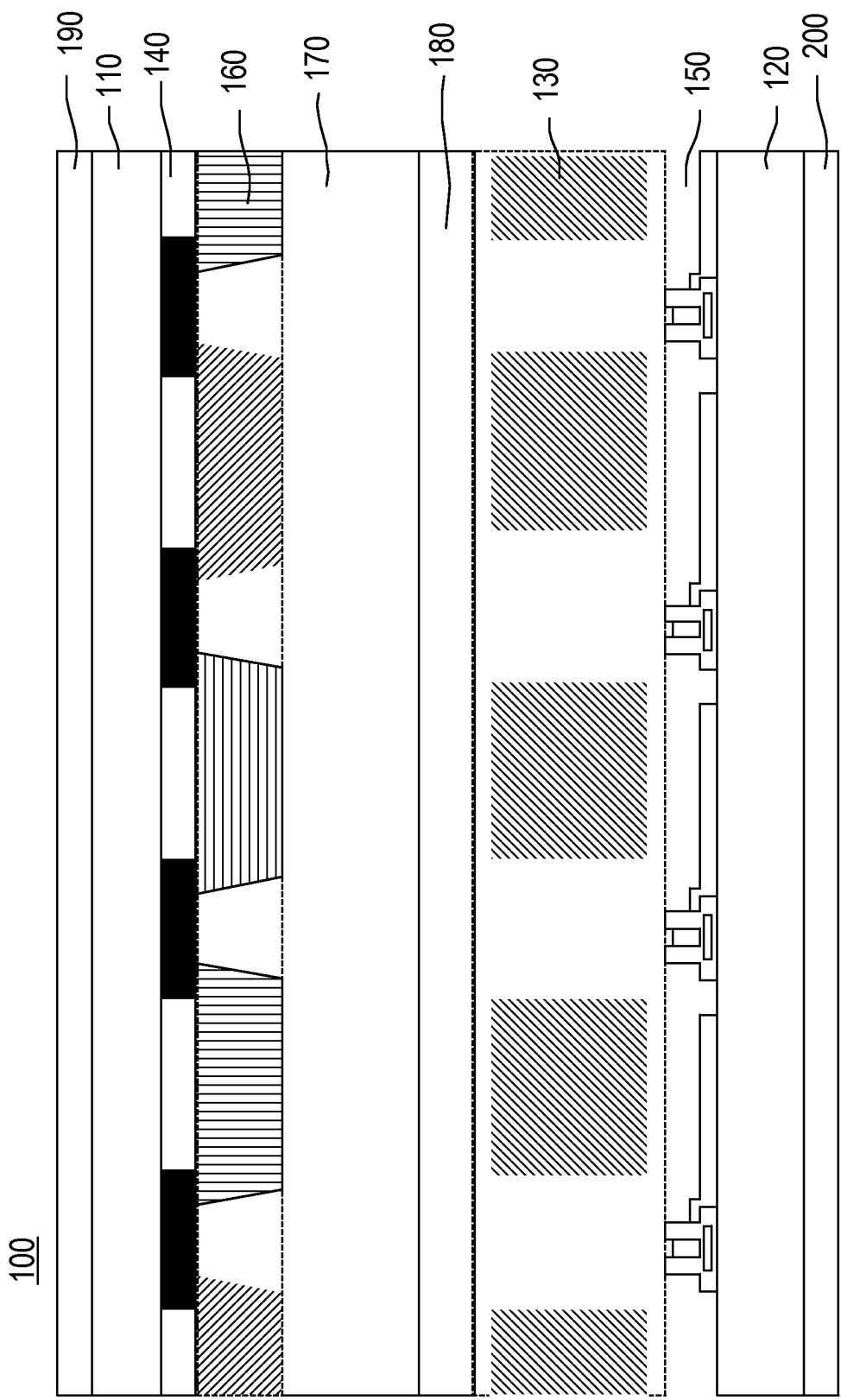
FIG. 1 shows an in-cell touch display panel structure with metal layer on lower substrate for sensing in accordance with a preferred embodiment of the present invention.

As shown in FIG. 1, there is shown an in-cell touch display panel structure with metal layer on lower substrate for sensing 100 in accordance is with a preferred embodiment of the present invention. The in-cell touch display panel structure with metal layer on lower substrate for sensing 100 includes an upper substrate 110, a lower substrate 120, a liquid crystal layer 130, a black matrix layer 140, a thin film transistor and sensing electrode layer 150, a color filter layer 160, an over coating layer 170, a common electrode (Vcom) layer 180, a first polarizer layer 190, and a second polarizer layer 200.

The upper substrate 110 and the lower substrate 120 are preferably glass substrates and are parallel to each other. The liquid crystal layer 130 is disposed between the upper and lower substrates 110, 120.

The black matrix layer 140 is between the upper substrate 110 and the liquid crystal layer 130 and is disposed at one surface of the upper substrate 110 that faces the liquid crystal layer 130. The black matrix layer 140 is composed of a plurality of opaque lines.

Figure 2:
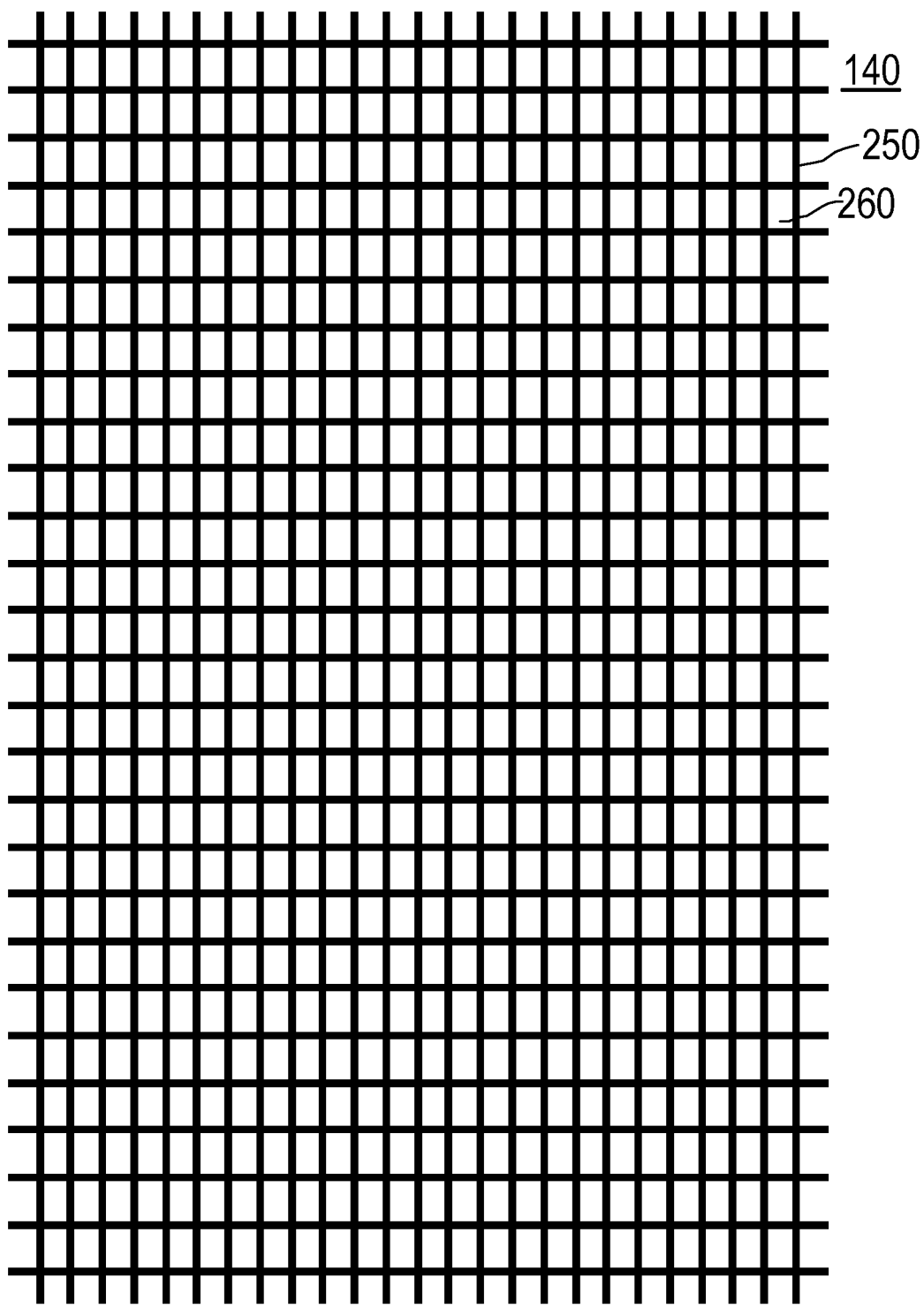
FIG. 2 shows a black matrix layer.

FIG. 2 shows the black matrix layer 140, which is the same as that of the prior LCD panel. As shown in FIG. 2, the black matrix layer 140 is composed of lines 250 of insulating material that are black and opaque. The lines 250 of black insulating material are arranged as a checkerboard pattern and the color filter is disposed among the spaces 260 disposed by the lines of black insulating material. It is noted that the dimension and the arrangement of the lines 250 of insulating material and the spaces 260, as shown in FIG. 2, are for illustrative purpose only, but not in actual scale and ratio.

In prior LCD panel structure, the thin film transistor layer is between the lower substrate and the liquid crystal layer and is disposed at one surface of the lower substrate that faces the liquid crystal layer.

In the present invention, a sensing electrode layer is provided on the prior thin film transistor layer on which a sensing touch pattern structure is defined, so as to form the thin film transistor and sensing electrode layer 150 in accordance with the present invention. Therefore, there is no need to arrange a sensing electrode layer on the upper glass substrate or the lower glass substrate of an LCD display panel, so as to reduce the manufacturing cost, simplify the manufacturing process and increase the yield rate. The thin film transistor and sensing electrode layer 150 is between the lower substrate 120 and the liquid crystal layer 130 and is disposed at one surface of the lower substrate 120 that faces the liquid crystal layer 130.

Figure 3:
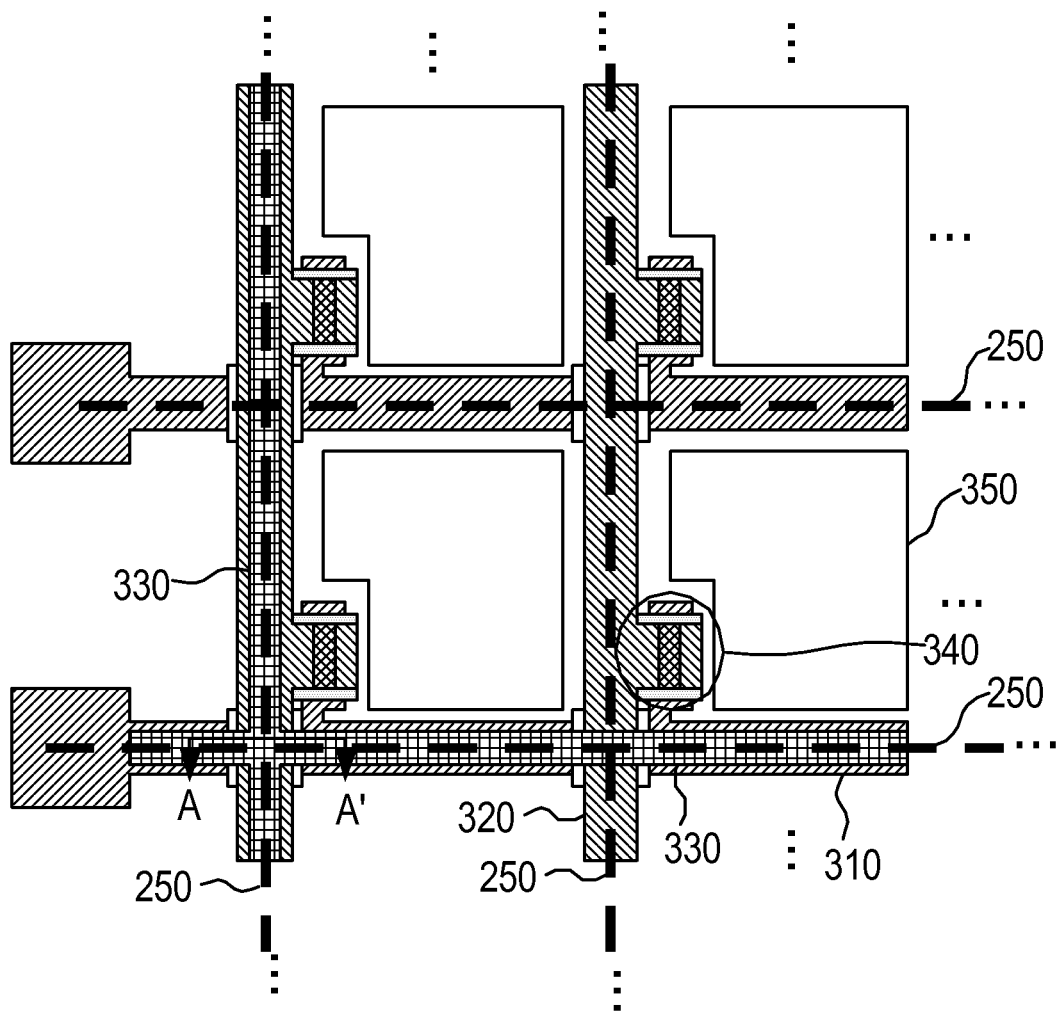
FIG. 3 schematically illustrates the thin film transistor and sensing electrode layer in accordance with the present invention.

FIG. 3 schematically illustrates the thin film transistor and sensing electrode layer 150 in accordance with the present invention, which is viewed from the upper substrate 110 to the lower substrate 120. The thin film transistor and sensing electrode layer 150 includes a plurality of scanning lines 310, a plurality of data lines 320, a plurality of sensing conductor lines 330, a plurality of transistors 340, and a plurality of pixel regions 350.

As shown in FIG. 3, the plurality of sensing conductor lines 330 are disposed at positions corresponding to the positions of the plurality of opaque lines 250 of the black matrix layer 140. The plurality of scanning lines 310 and the plurality of data lines 320 are disposed at positions corresponding to the positions of the plurality of opaque lines 250 of the black matrix layer 140. Further, the plurality of sensing conductor lines 330 are disposed at one surface of the plurality of scanning lines 310 and the plurality of data lines 320 that face the liquid crystal layer 130.

In prior LCD display structure, the scanning lines and the data lines are disposed at positions below the opaque lines. In comparison, in the present invention, the plurality of sensing conductor lines 330 are disposed at positions above the positions of the plurality of scanning lines 310 and the plurality of data lines 320. That is, the plurality of sensing conductor lines 330 are also disposed at positions corresponding to the positions of opaque lines 250 of the black matrix layer 140. Therefore, the plurality of sensing conductor lines 330 are also concealed by the plurality of opaque lines 250.

Figure 4A:
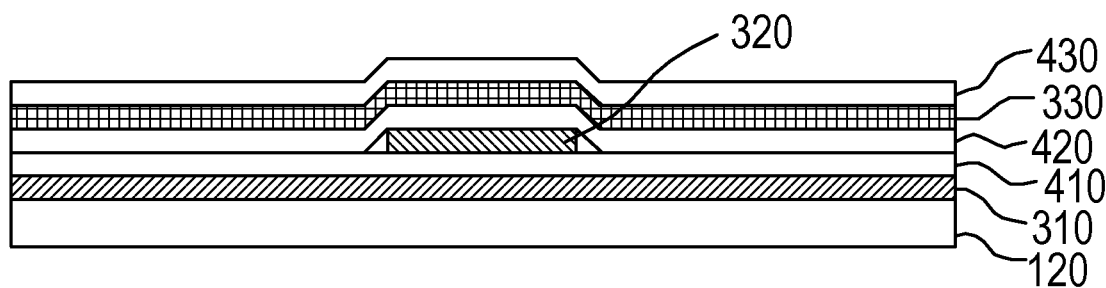
FIGS. 4(A) and 4(B) respectively illustrate two embodied cross sectional views taking along A-A' line of FIG. 3.
Figure 4B:
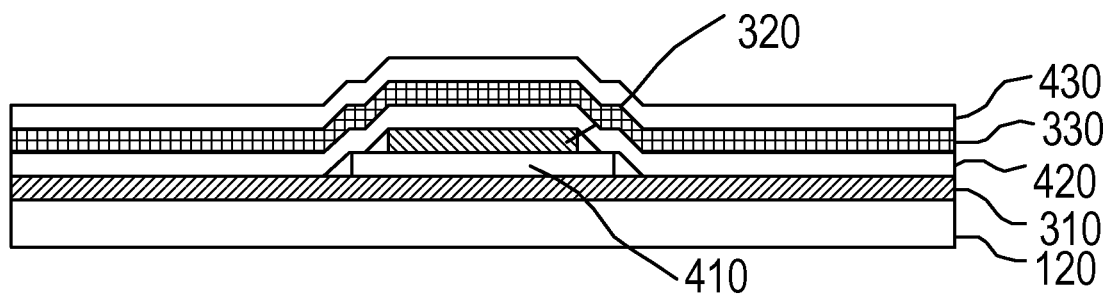

FIGS. 4(A) and 4(B) respectively illustrates two embodied cross sectional views taking along A-A' line of FIG. 3. As shown in FIG. 4(A), the scanning line 310 is arranged on the lower substrate 120 and there is a first insulation region 410 arranged above the scanning line 310 so that the data line 320 and the scanning line 310 are insulated from each other. There is a second insulation region 420 arranged above the data line 320 so that the data line 320 and the sensing conductor line 330 are insulated from each other. Further, there is a third insulation region 430 arranged above the sensing conductor line 330. In FIG. 4(B), first, second and third insulation layers 410, 420, 430 are arranged in a manner similar to FIG. 4(A), except that the first insulation layer 410 is arranged only at an intersection of the data line 320 and the scanning line 310 since the first insulation layer 410 is primarily provided for allowing the data line 320 and the scanning line 310 to be insulated from each other.

Figure 5:
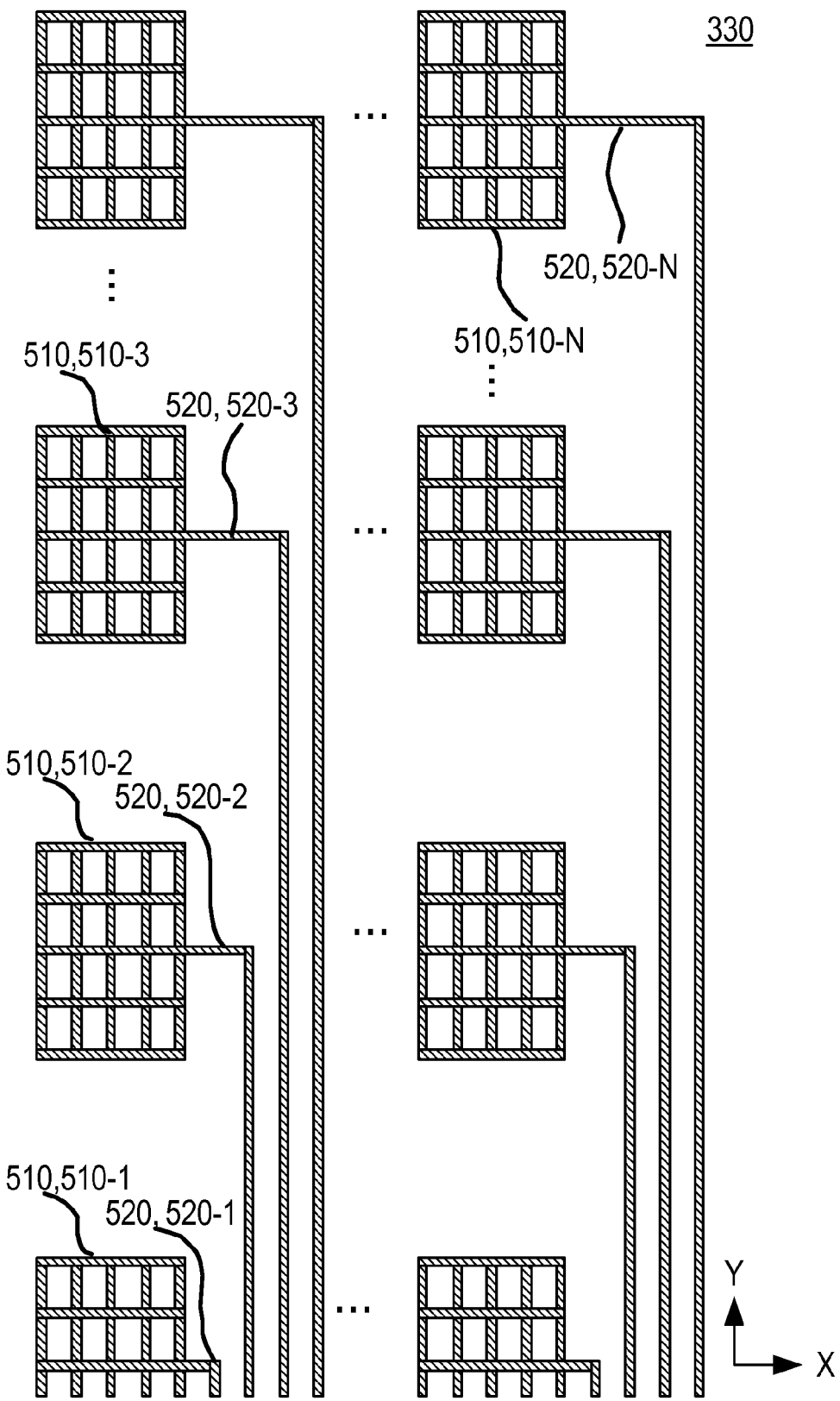
FIG. 5 is a schematic diagram of the plurality of sensing conductor lines in accordance with the present invention.

FIG. 5 is a schematic diagram of the plurality of sensing conductor lines in accordance with the present invention, which is viewed from the lower substrate 120 to the upper substrate 110. As shown in FIG. 5, the plurality of sensing conductor lines 330 of the thin film transistor and sensing electrode layer 150 are arranged in a first direction (X-direction) and a second direction (Y-direction), wherein the first direction is vertical with the second direction. The plurality of sensing conductor lines 330 of the thin film transistor and sensing electrode layer 150 are made of conductive metal material or alloy material, wherein the conductive metal material is selectively to be chromium, barium, aluminum, titanium, and alloy thereof.

The plurality of sensing conductor lines 330 are divided into a first group of sensing conductor lines 510 and a second group of sensing conductor lines 520. The first group of sensing conductor lines 510 is formed with N quadrilateral regions 510-1 to 510-N, where N is a positive integer. The sensing conductor lines in any one of the quadrilateral regions are electrically connected together while the sensing conductor lines in any two quadrilateral regions are not electrically connected, so as to form a single-layered touch pattern on the thin film transistor and sensing electrode layer 150.

Each of the quadrilateral regions 510-1 to 510-N is formed in a rectangle, square, or rhombus shape. In this embodiment, each of the quadrilateral regions 510-1 to 510-N is formed in a rectangle shape, and the plurality of sensing conductor lines 330 are disposed at positions corresponding to the positions of the plurality of opaque lines 250 of the black matrix later 140.

The second group of sensing conductor lines 520 is formed with N conductor traces 520-1 to 520-N. Each of the N conductor traces 520-1 to 520-N is electrically connected to a corresponding quadrilateral region 510-1 to 510-N, while any two conductor traces 520-1 to 520-N are not electrically connected.

Figure 6:
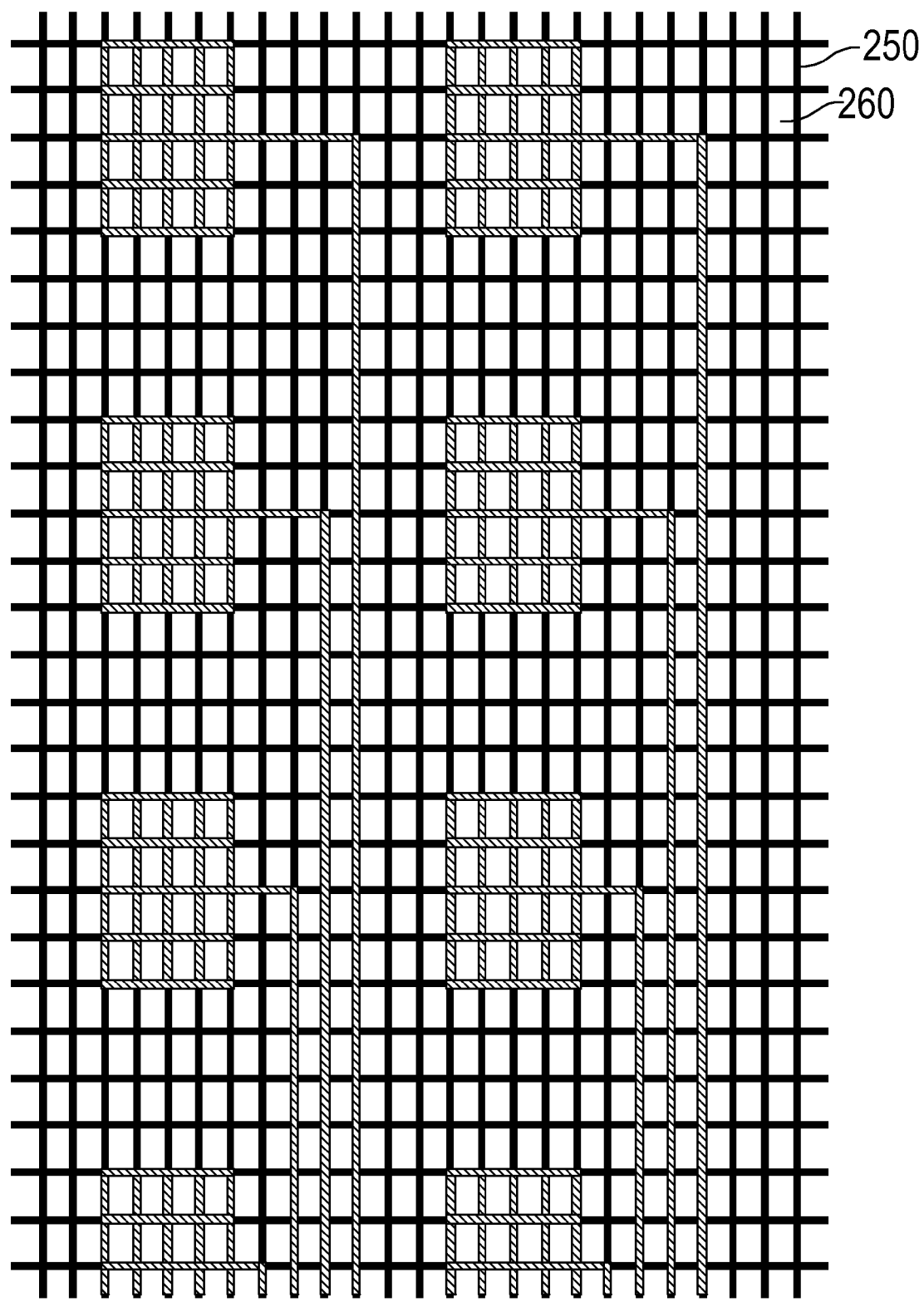
FIG. 6 is a schematic diagram of the black matrix layer and the plurality of sensing conductor lines in accordance with the present invention.

FIG. 6 is a schematic diagram of the black matrix layer 140 and the plurality of sensing conductor lines 330 in accordance with the present invention, which is viewed from the lower substrate 120 to the upper substrate 110. As shown, it schematically illustrates the black matrix layer 140 overlapped with the plurality of sensing conductor lines 330.

The first group of sensing conductor lines 510 is correspondingly connected to the second group of sensing conductor lines 520. That is, the N conductor traces 510-1 to 510-N are respectively connected to the N conductor traces 520-1 to 520-N. Therefore, the first group of sensing conductor lines 510 can form a single-layered touch pattern on the thin film transistor and sensing electrode layer 150. The line width of the first group of conductor lines 510 or the second group of conductor lines 520 is preferred to be smaller than or equal to the line width of the plurality of the opaque lines 250. When viewing from the upper substrate 110 to the liquid crystal layer 130, the first group of conductor lines 510 and the second group of conductor lines 520 can be concealed by the plurality of opaque lines 250, so that users only see the plurality of opaque lines 250 but not the first group of conductor lines 510 and the second group of conductor lines 520.

The color filter layer 160 is disposed on one surface of the black matrix layer 140 that faces the liquid crystal layer 130.

The over coating layer 170 is disposed on the surface of the color filter layer 160.

The common electrode layer 180 is disposed between the upper substrate 110 and the lower substrate 120. For VA and TN type LCD device, the common electrode layer 180 is disposed on the upper substrate 110. For IPS and EFS type LCD device, the common electrode layer 180 is disposed on the lower substrate 120.

The first polarizer layer 190 is disposed at one surface of the upper substrate 110 opposite to the other surface of the upper substrate 110 facing the liquid crystal layer 130.

The second polarizer layer 200 is disposed at one surface of the lower substrate 120 opposite to the other surface of the lower substrate 120 facing the liquid crystal layer 130.

In view of the foregoing, it is known that the present invention is capable of forming a single-layered touch pattern on the thin film transistor and sensing electrode layer 150, which has the advantage of not requiring to arrange a sensing electrode layer on the upper glass substrate or lower glass substrate of the LCD panel, thereby lowering the cost and decreasing the number of manufacturing steps.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel structure with metal layer on lower substrate for sensing, comprising:
   an upper substrate;
   a lower substrate parallel to the first substrate;
   a liquid crystal layer configured between the upper substrate and the lower substrate;
   a black matrix layer disposed at one surface of the upper substrate facing the liquid crystal layer, the black matrix layer being composed of a plurality of opaque lines; and
   a thin film transistor and sensing electrode layer disposed at one surface of the lower substrate facing the liquid crystal layer, the thin film transistor and sensing electrode layer including a plurality of scanning lines, a plurality of data lines, and a plurality of sensing conductor lines,
   wherein the plurality of sensing conductor lines are disposed corresponding to positions of the plurality of opaque lines of the black matrix;
   wherein the plurality of scanning lines and the plurality of data lines are disposed corresponding to the positions of the plurality of opaque lines of the black matrix, and the plurality of sensing conductor lines are disposed at one surface of the plurality of scanning lines and the plurality of data lines facing the liquid crystal layer;
   wherein the plurality of sensing conductor lines are divided into a first group of sensing conductor lines and a second group of sensing conductor lines, the first group of sensing conductor lines being formed to be N quadrilateral regions, where N is a positive integer, the sensing conductor lines in any one of the quadrilateral regions being electrically connected together while the sensing conductor lines in any two quadrilateral regions are not electrically connected, so as to form a single-layered touch pattern on the thin film transistor and sensing electrode layer.

2. The in-cell touch display panel structure with metal layer on lower substrate for sensing as claimed in claim 1, wherein the second group of sensing conductor lines is formed to be N conductive traces, each of the N conductive traces being electrically connected to a corresponding quadrilateral region, while any two conductive traces are not electrically connected.

3. The in-cell touch display panel structure with metal layer on lower substrate for sensing as claimed in claim 2, wherein the plurality of sensing conductor lines of the thin film transistor and sensing electrode layer are arranged in a first direction and a second direction.

4. The in-cell touch display panel structure with metal layer on lower substrate for sensing as claimed in claim 3, wherein the first direction is orthogonal to the second direction.

5. The in-cell touch display panel structure with metal layer on lower substrate for sensing as claimed in claim 4, further comprising a color filter layer that is disposed on one surface of the black matrix layer that faces the liquid crystal layer.

6. The in-cell touch display panel structure with metal layer on lower substrate for sensing as claimed in claim 5, further comprising an over coating layer disposed on a surface of the color filter.

7. The in-cell touch display panel structure with metal layer on lower substrate for sensing as claimed in claim 6, further comprising a common electrode layer disposed between the upper substrate and the lower substrate.

8. The in-cell touch display panel structure with metal layer on lower substrate for sensing as claimed in claim 7, wherein each of the quadrilateral regions is formed in a rectangle, square, or rhombus shape.

9. The in-cell touch display panel structure with metal layer on lower substrate for sensing as claimed in claim 8, wherein the plurality of sensing conductor lines of the thin film transistor and sensing electrode layer are made of conductive metal material or alloy material.

10. The in-cell touch display panel structure with metal layer on lower substrate for sensing as claimed in claim 9, wherein the conductive metal material is selectively to be chromium, barium, aluminum, titanium, and alloy thereof.

* * * * *